United States Patent [19]

Heffernan

[11] Patent Number: 4,824,487
[45] Date of Patent: Apr. 25, 1989

[54] CLEANING OF POLYURETHANE FOAM RESERVOIR

[75] Inventor: Mary B. Heffernan, Encinitas, Calif.

[73] Assignee: Hewlett-Packard Company, Palo Alto, Calif.

[21] Appl. No.: 72,079

[22] Filed: Jul. 10, 1987

[51] Int. Cl.$^4$ ............................................. B08B 9/00
[52] U.S. Cl. ...................................... 134/10; 134/11; 134/12; 134/25.1; 134/25.4; 134/39; 134/40; 134/135
[58] Field of Search ...................... 134/10, 11, 12, 39, 134/40, 25.1, 254, 135

[56] References Cited

U.S. PATENT DOCUMENTS 3,460,990  8/1969  Barclay ................................. 134/11
4,209,344  6/1980  Simon et al. ....................... 134/25.4

FOREIGN PATENT DOCUMENTS 2203991  8/1973  Fed. Rep. of Germany ........ 134/12
548116  3/1941  United Kingdom ................. 134/11

Primary Examiner—Asok Pal

[57] ABSTRACT

A process and apparatus (10) are provided for cleaning foam parts used as reservoirs in ink-jet cartridges. Apparatus used in cleaning clean room garments is modified to enable cleaning of thousands of foam parts in a batch mode. The modification includes provided a temperature sensor (60) to ensure that only solvent is distilled over, but not non-volatile residues, and a level sensor (62) to determine if the liquid level in the still (36) is too low and therby reduce power to the heating element (38).

20 Claims, 2 Drawing Sheets

CLEANING OF POLYURETHANE FOAM RESERVOIR

TECHNICAL FIELD

The present invention relates generally to removing non-volatile residues from polyurethane foam reservoirs, especially foam reservoirs used for storing ink in ink-jet printers.

BACKGROUND ART

Foam, such as polyether-type polyurethane foam, is used to store ink in ink-jet printers. Typically, a foam block is inserted into a cartridge and is loaded with ink. The cartridge includes at one end thereof a printhead comprising a nozzle plate, orifices and associated fluidic means for ejecting droplets of ink onto a printing medium, such as paper, under control of a microprocessor. During printing, the ink is released from the foam reservoir upon demand by negative pressure at the printhead.

Contamination of the foam can lead to plugging of the orifices of the printhead and early failure of the cartridge, necessitating premature replacement of the cartridge and concomitant waste of unuseable ink. Such contamination arises during the foam manufacturing process and also during the subsequent foam cutting process, when sheets of the foam are cut into individual blocks for insertion into the cartridges.

Simply rinsing the foam blocks in a suitable solvent is insufficient to remove contaminants such as non-volatile residues (NVR). Thus, apparatus and a method for removing such NVRs is needed.

DISCLOSURE OF INVENTION

In accordance with the invention, apparatus and a method for cleaning foam used as reservoirs in ink-jet printers are provided. The apparatus comprises a recirculative, closed loop, self-contained decontamination system capable of handling large loads of foam parts with minimal solvent loss and minimal operator exposure to the solvent. In addition, the apparatus, which includes a batch distill system to supply a working sump with pure solvent, also includes an improved vapor temperature sensor to terminate the batch distillation process and an improved level sensor to avoid carryover of contaminants from the batch distill system to the working sump during the batch distillation process.

In the method of cleaning foam, a solvent is provided and the foam is exposed thereto. The foam and solvent are agitated for a time, the solvent is drained, and the agitation and drain cycle is repeated at least twice more. The foam is removed from the apparatus and dried. The system is then switched to the batch-distill mode to clean the solvent.

The cleaned foam parts evidence considerably reduced levels of contamination by non-volatile residues and hence the printhead cartridges associated with such cleaned foam reservoirs enjoy increased life.

BEST MODES FOR CARRYING OUT THE INVENTION

Figure 1:
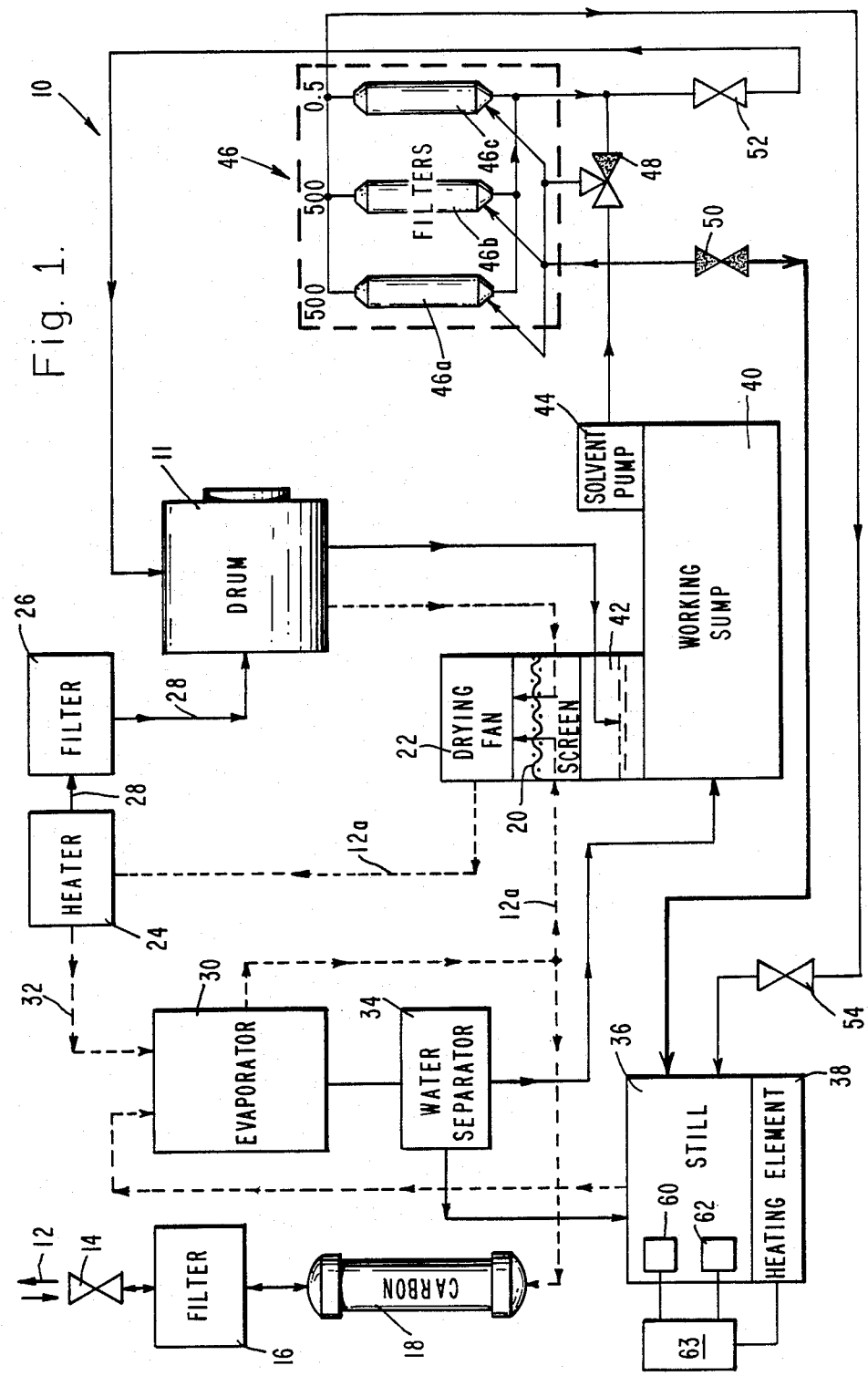
FIG. 1 is a schematic view of apparatus suitable in the practice of the invention and depicting fluid flow in normal operation.

An apparatus normally used to wash clean room garments in a halo-hydrocarbon solvent may be modified to clean non-volatile residues (NVR) from foam reservoirs used in ink-jet cartridges. The loading of contaminants to be removed from foam far exceeds the level seen in clean room garments. Thus, the apparatus requires special sensors to avoid carrying the NVR from the batch distill sump to the working sump during the batch distillation process.

The apparatus modified for use in the practice of the invention permits large loads of foam parts to be cleaned at one time with minimal loss of solvent and with minimal operator exposure to the solvent.

The cleaning process involves several sequential wash and drain cycles, using a closed still system. An example of such a system is available from Western State Design (Hayward, CA) under the trade designation Submicronix DS/5500. The system preferably employs a non-toxic, non-polar, non-flammable solvent, such as 1,1,2-trichloro-1,2,2-trifluoroethane, also known as Freon 113. While other solvents may be employed, the ease of use of this solvent makes it the preferable solvent of choice.

The foam parts must be cleaned, since they are cut into the desired shapes by the manufacturer and machine oil is employed in the cutting.

The apparatus 10 of the invention is essentially a single plate distillation column. Referring now to the drawings wherein like numerals of reference designate like parts throughout, a rotatable drum 11 holds the foam parts. In the embodiment described herein, the drum 11 may hold thousands of foam parts. Solvent vapor is added or removed from line 12, controlled by a valve 14. The solvent vapor passes through a particle filter 16 and a carbon trap 18.

The inlet line 12a passes to a lint screen 20, then to a drying fan 22 and a heater 24. At the heater 24, the inlet line is split, with part of the solvent (liquid) passing through a filter 26 and into the drum 11 along line 28 and part of the solvent vapor passing through an evaporator 30 along line 32. In the evaporator 30, a portion of the solvent vapor re-enters the inlet line 12a and either passes on to the lint screen 20 or to the carbon trap 18 and filter 16 for eventual removal.

Liquid from the evaporator 30 is taken out and passed to a water separator 34, with water entering still 36, where it is heated by a heating element 38. The heating element 38 is commonly an oil heater. The dewatered solvent (liquid) passes to working sump 40. Liquid solvent also passes from the cleaning drum 11 to the working sump 40 through a button trap 42.

Liquid solvent from the working sump 40 is pumped by solvent pump 44 to a bank of micron filters 46 (500 μm - 46a; 500 μm - 46b; 0.5 μm - 46c) through a three-way valve 48. The filters 46 are associated with a still valve 50 and a drum valve 52.

With still valve 50 open and drum valve 52 closed and with valve 48 on the drum valve side closed, as shown in FIG. 1, then liquid solvent passes through the micron filters 46 and into the drum 11.

Figure 2:
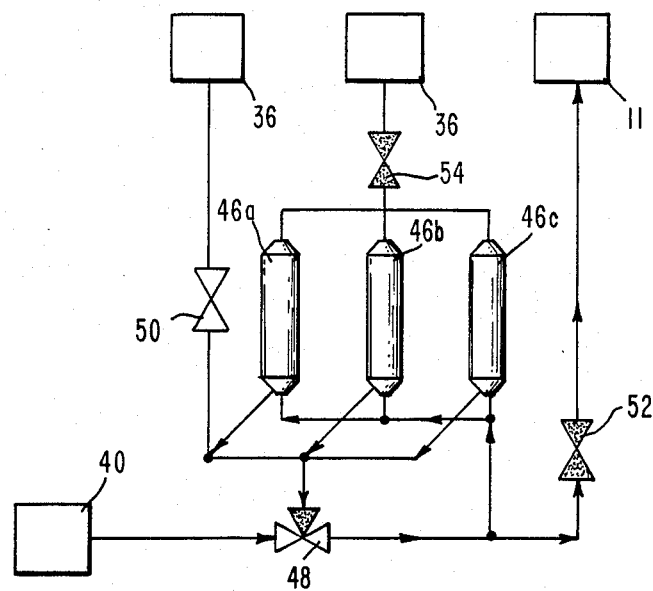
FIG. 2 is a schematic view of a portion of the apparatus depicted in FIG. 1, illustrating fluid flow during backwash.

As shown in FIG. 2, with still valve 50 open and drum valve 52 closed and with valve 48 on the still valve side closed, then the apparatus is in a backwash condition. Closed solenoid valve 54 prevents solvent from entering the still 36. In this mode, solvent is used to back-flush the filters 46, with the solvent passing from the filters to the still 36.

Figure 3:
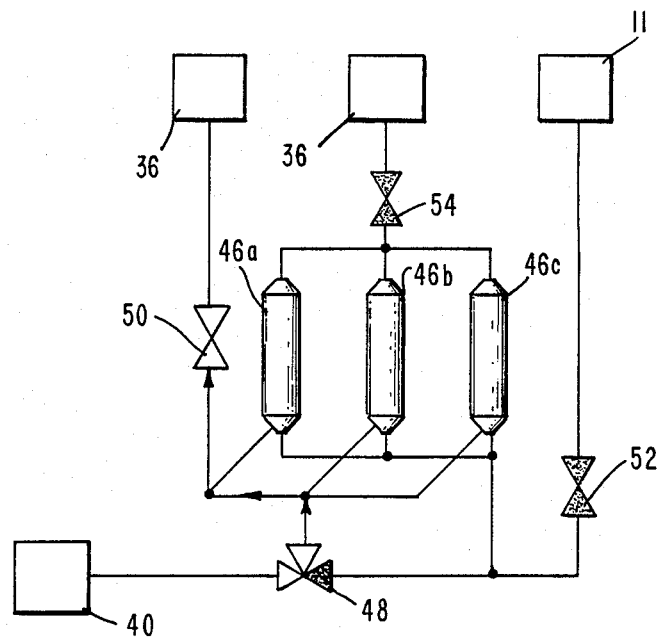
FIG. 3 is a schematic view similar to that of FIG. 2, but showing fluid flow direct to the still from the solvent tank.

As shown in FIG. 3, with still valve 50 open and drum valve 52 closed and with valve 48 closed on the drum valve side, then the apparatus is in the direct-to-still mode, and solvent passes from the working sump 40 directly to the still 36 through valve 50 without passing through the filters 46.

The apparatus is beneficially improved by including therein an improved temperature sensor 60 in the still 36 to ensure that only solvent is distilled over, but not NVRs. The unmodified unit runs the batch distill mode at about 180° F. A modification made to the oil heater 38 driving the distillation permits operating at two temperatures, 180° F. and 120° F.

The apparatus is further beneficially improved by including therein a level sensor 62, such that if the liquid level in the still 36 gets too low, then the temperature of the heating element 38 is reduced to the lower value. The level of fluid in the sump 36 is detected by a capacitive-type level sensor. When this level is reached, a controller 63 switches the oil heater 38 to the lower setting. The distillation continues until the vapor temperature sensor 60 detects a rise in the vapor temperature above its boiling point and shuts the unit off via the controller 63.

Laboratory scale distillation of Freon 113 loaded with foam NVR was performed. At temperatures slightly above the boiling point of Freon 113, NVRs were detected in distillation fractions. This means that the vapor temperature sensor 60 must exhibit good sensitivity to small temperature changes, that is, on the order of about 0.1° to 0.2°, and relay that signal immediately and effectively, or the sump 36 will distill to dryness and carry over much of the NVRs.

The level sensor 62 eliminates operator interaction by automatically switching the sump heater 38 to the lower temperature (120° F.). Without this modification, the operator must judge this level by viewing the fluid level through a sight glass.

The combination of the two sensors is necessary to ensure no carry-over of NVRs. If only the vapor temperature sensor 60 is used, the residual heat from the sump heater 38 can cause NVR carry-over. If only the fluid level sensor 62 is used, it could allow NVR carry-over if the NVR loading is heavier than expected, or on batch distill runs performed just before the sump 36 is manually cleaned.

At least three successive clean cycles of one foam batch are required to provide the required level of cleanliness of the foam parts. Following the cleaning cycles, the solvent is then batch distilled to purify it.

During the cleaning process, the foam parts are agitated in the liquid solvent for a period of time. The agitation period should be no more than about 15 minutes. An agitation period of at least 5 minutes seems adequate.

The temperature of the solvent is limited by the pressure that the seals of the apparatus can withstand. The maximum temperature is thus about the boiling point of the solvent. In the case of Freon 113, the maximum temperature is about 47.5° C. However, while hot solvent is superior to cold solvent for removing non-volatile residues, the time required to wait for the pressure to dissipate sufficiently to permit removal of the foam parts from the drum 11 suggests use of the solvent at room temperature.

Following removal of the foam parts from the drum 11, the foam parts are allowed to air dry for at least about one hour in a clean environment, such as clean room of Class 10,000. The air drying permits the foam parts to return to their original felted shape. However, oven drying or vacuum-assisted oven drying may alternatively be employed.

In order to obtain the cleanliness level required for the foam parts to serve as reservoirs for inks used in ink-jet printing, the non-volatile residues must be removed to a level of less than about 0.2 wt/wt %. Such determination may be made by a variety of procedures. The apparatus and process of the invention provide such reduced levels of NVRs.

INDUSTRIAL APPLICABILITY

The apparatus and process of the invention are suitably employed in cleaning foam reservoir parts used in ink-jet cartridges.

Thus, apparatus and cleaning process have been provided for cleaning foam reservoir parts used in ink-jet cartridges. It will be appreciated by those of ordinary skill in the art that various changes and modifications of an obvious nature may be made without departing from the spirit and scope of the invention, and all such changes and modifications are considered to be within the scope of the invention, as defined by the appended claims.

What is claimed is:

1. A process of cleaning foam parts used as ink reservoirs and ink delivery systems in ink-jet printers comprising:
    (a) providing a solvent in a container;
    (b) exposing said foam parts to said solvent in said container;
    (c) agitating said foam parts in said container for a period of time;
    (d) draining said solvent from said foam parts;
    (e) repeating steps (b) through (d) at least twice;
    (f) removing said foam parts; and
    (g) drying said foam parts in a clean environment.

2. The process of claim 1 wherein said solvent comprises a non-toxic, non-polar, non-flammable solvent.

3. The process of claim 2 wherein said solvent comprises a member selected from the group consisting of halo-hydrocarbons and hydrocarbons.

4. The process of claim 3 wherein said solvent comprises 1,1,2-trichloro-1,2,2,-trifluoroethane.

5. The process of claim 3 wherein said solvent comprises hexane.

6. The process of claim 1 wherein said foam parts are agitated for at least about five minutes.

7. The process of claim 6 wherein said foam parts are agitated for no more than about fifteen minutes.

8. The process of claim 1 wherein said foam parts are allowed to air dry for at least about one hour.

9. The process of claim 1 wherein said foam parts are dried at an elevated temperature in an oven.

10. The process of claim 9 wherein a partial vacuum is pulled in said oven to assist said drying.

11. Apparatus for cleaning foam reservoir parts used in ink-jet cartridges and reducing non-volatile residues therein, including a drum for holding a plurality of said parts, a source of cleaning solvent, means for filtering said solvent and means for distilling said solvent, including a heating element therefor, wherein said apparatus further includes a vapor temperature sensor to ensure distilling over said solvent but not said non-volatile residues and a level sensor to reduce the temperature of said heating element if the level of liquid in said distilling means drops below a predetermined level.

12. The apparatus of claim 11 wherein said solvent comprises a non-toxic, non-polar, non-flammable solvent.

13. The apparatus of claim 12 wherein said solvent comprises a member selected from the group consisting of halo-hydrocarbons and hydrocarbons.

14. The apparatus of claim 13 wherein said solvent comprises 1,1,2-trichloro-1,2,2,-trifluoroethane.

15. The apparatus of claim 13 wherein said solvent comprises hexane.

16. The apparatus of claim 11 wherein said vapor temperature sensor has a sensitivity of a few tenths of a degree.

17. The apparatus of claim 11 wherein said heating element is capable of operating at two temperatures, a higher temperature for normal operation and a lower temperature if said level of liquid in said distilling means drops below said predetermined level.

18. The apparatus of claim 17 wherein said upper temperature is about 180° F. and said lower temperature is about 120° F.

19. A process for cleaning in a closed loop system, polyurethane foam parts used as ink reservoirs and ink delivery systems in ink-jet printers comprising:
    (a) providing a solvent in a container;
    (b) exposing said foam parts to said solvent in said container;
    (c) agitating said foam parts in said container for a period of time;
    (d) draining said solvent from said foam parts;
    (e) repeating steps (b) through (d) as least twice;
    (f) removing said foam parts;
    (g) drying said foam parts in a clean environment;
    (h) passing used solvent through a micron filter, and
    (i) returning filtered solvent to said container.

20. The process of claim 19, wherein used solvent is separated from non-volatile residue by distillation under conditions which prevents the level of liquid from dropping below a predetermined level.

* * * * *